United States Patent [19]
Liu

[11] Patent Number: 5,638,923
[45] Date of Patent: Jun. 17, 1997

[54] SNOW BRAKE SYSTEM FOR VEHICLES

[76] Inventor: Juntain Liu, 3348 S. Ogden St., Englewood, Colo. 80110

[21] Appl. No.: 539,622

[22] Filed: Oct. 5, 1995

[51] Int. Cl.⁶ ............................................. B60T 1/14
[52] U.S. Cl. ............................................. 188/6; 188/4
[58] Field of Search .............................. 188/4, 6

[56] References Cited

U.S. PATENT DOCUMENTS

| | | | |
|---|---|---|---|
| 1,841,280 | 1/1932 | Edwards | 188/6 |
| 1,972,702 | 9/1934 | Cohen et al. | 188/6 |
| 2,233,994 | 3/1941 | Cook | 188/6 |
| 2,856,029 | 10/1958 | Hereil et al. | 188/6 |
| 3,292,738 | 12/1966 | Bernert et al. | 188/6 |

FOREIGN PATENT DOCUMENTS

| | | | |
|---|---|---|---|
| 1755039 | 12/1971 | Germany | 188/6 |

*Primary Examiner*—Matthew C. Graham
*Attorney, Agent, or Firm*—Joe Zheng; Lin & Li

[57] ABSTRACT

A snow break system, as a supplemental break device to a regular break system in a vehicle, comprises at least a pair of brake boosters. Each of the brake boosters mounted under the vehicle has a frictional head made out of a heavy duty material. A hydraulic booster drives the frictional head downward to confront a road surface to cause a considerable frictional force. A mechanism controlled by an operator of the vehicle controls the positions of the brake system, being either in a released position or an engaged position. When the snow brake system is in the released position, the brake pedal operation actuates the regular brake system. When the snow brake system is in the engaged position, the same brake pedal operation actuates both of the snow brake system and the regular brake system.

3 Claims, 5 Drawing Sheets

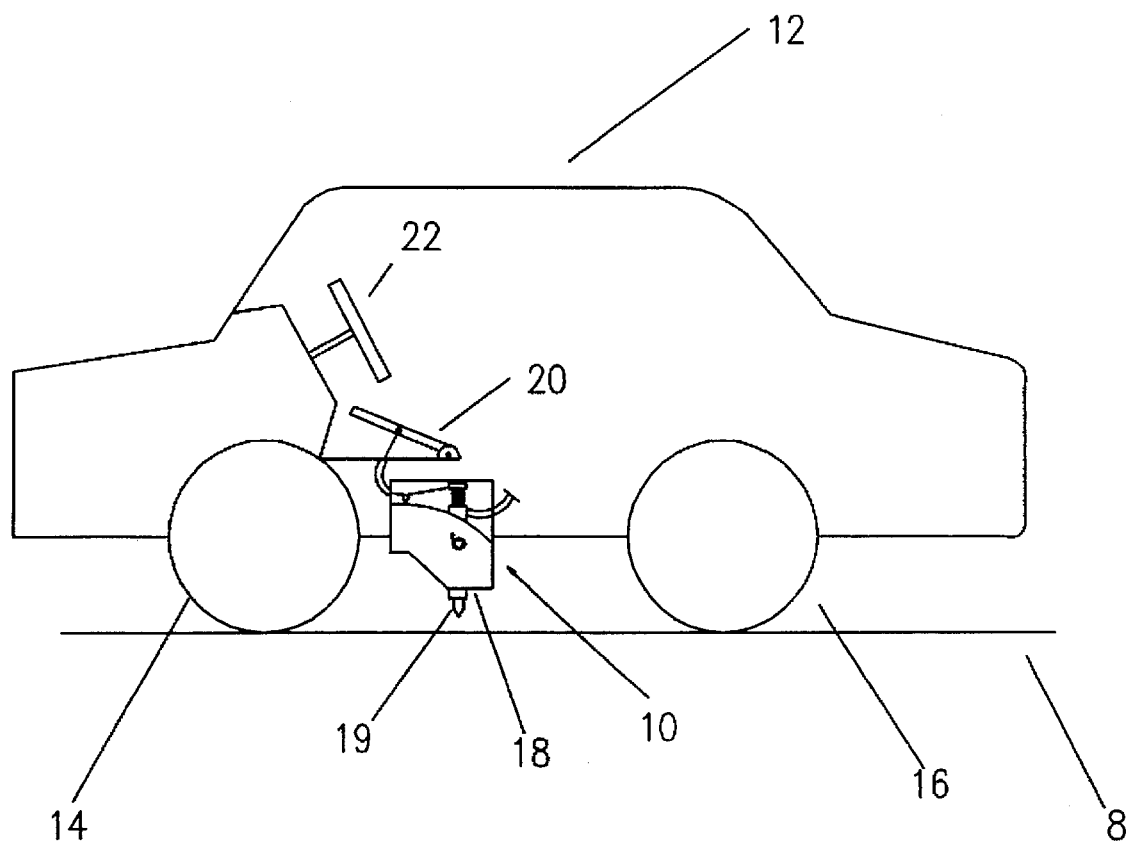
Fig.1.1

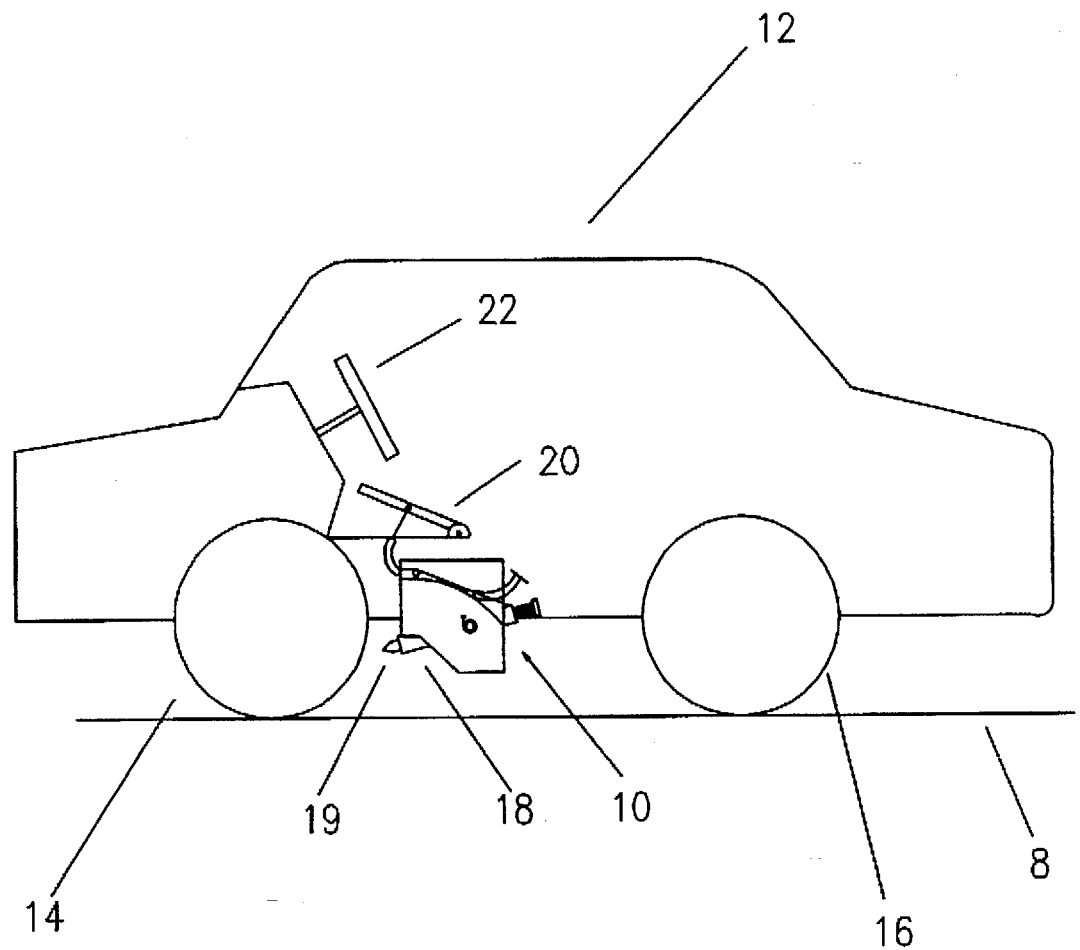
Fig.1.2

SNOW BRAKE SYSTEM FOR VEHICLES

FIELD OF INVENTION

The present invention relates to the area of brake systems for vehicles and more particularly relates to a snow brake system that stops a vehicle immediately when the vehicle is in slippery road conditions.

DESCRIPTION OF THE RELATED ART

Since the inception of moving objects or vehicles, brakes have been designed to prevent the vehicles from going further when there is a need to stop the vehicles. There are many cases that require a vehicle to stop gradually while there are many other cases that require a vehicle to stop instantaneously. For example, a vehicle may be slowed down when a pedestrian is seen in a certain distance in the driving way and the vehicle has to stop instantaneously if a pedestrian emerges suddenly in the driving way. Many forms of brakes have been devised to meet various needs. From the early air brakes to the present time, electronic pneumatic brake control system, the primary objective of the brakes has been the same, namely to have enough frictional forces pressed on the wheels of the vehicle so that the vehicle can be stopped immediately when there is a need to do so.

A brake system for a vehicle is conventionally controlled by a depressed force applied to a brake pedal which causes the brake system to produce enough frictional forces to retard the motion of the vehicle wheels. Early systems employ a mechanical brake pack including levers, links and/or cams, responsive to the brake pedal pressure to compress the brake pack and therefore to decelerate the wheels. The deceleration rate is controlled solely by the depressed force applied to the brake pedal. To reduce the dependence on the brake pedal effort, later brake systems combine a hydraulic apply system with a mechanical apply system to reduce the required pedal effort for a given deceleration rate. The force generated by the hydraulic and the mechanical apply systems is combined to compress the brake pack for efficient retardation of the wheels.

In addition, various supplemental systems to a regular brake system have been developed to enhance the brake performance in severe road conditions. The well-known anti-lock brake systems (ABS) are becoming options to many medium-priced passenger cars. ABS is adapted to the regular brake system for a better performance. Under the anti-lock control, slip and skid of each wheel in a vehicle can be efficiently reduced so that braking safety is increased. U.S. Pat. No. 5,393,131 to Nomura describes an equalizing system to equalize hydraulic pressures on both front wheels and rear wheels in order to prevent the rear wheels from locking. U.S. Pat. No. 5,387,073 to Watanabe discloses an apparatus for preventing excessive slipping of wheels by using a pressure regulator to regulate a brake force pressed on the wheels based on at least an amount of change of a rotating speed of the wheel. A device for obtaining the rotating speed of the wheel is used therein.

These aforementioned approaches and examples appear to be effective to stop a moving vehicle in normal driving conditions. Nevertheless It is generally experienced that a vehicle goes an excessive extent after the brake is applied when the road is in severe conditions such as being icy and muddy. The same may be experienced when a vehicle runs down a slope. The excessive extent causes many traffic accidents in snow days due to an excessive drive force transmitted to the wheels in relation to a frictional force between the wheels and the road surface. Many aforementioned brake systems then become less effective when the road conditions become slippery due to a significant reduction of the frictional force between the wheels and the road surface. To increase the frictional force, there are many methods in practice. The most common one is to have snow tires installed. The snow tires are designed to have more frictional forces than the regular tires but it is commonly known that the mileage per gallon of fuel is lowered accordingly. In addition, it is not practical to exchange for the regular tires for normal road conditions and exchange for the snow tires for slippery road conditions. There is, therefore, a great need for a brake system which is effective to stop the vehicle driving in various road conditions when the brake pedal is applied. Many efforts have been tried to increase the frictional force between the wheels and the road surface, there has further been a need for a brake system that causes a significant frictional force between the vehicle and the road surface, along with a regular brake system, to stop the vehicle immediately. Most passenger vehicles have been equipped with regular brake systems and the operators thereof are used to the brake pedal operations. Any significant modification of the braking operations may pose considerable difficulties. There thus has still been a need for a snow brake system that is actuated by the same brake pedal and can be readily released for normal driving road conditions and be readily engaged for slippery road conditions.

SUMMARY OF THE INVENTION

The present invention has been made in consideration of the above described problems and needs. The present invention provides a snow brake system that, if equipped in a vehicle, preferably in a passenger automobile, proves to be effective for slippery iced road and slope conditions.

According to one aspect of the invention, the brake system is a separate brake device that supplements to a regular brake system. When the road conditions are normal, namely there are no possibilities of being slippery, the snow brake system can be released and only the regular brake system is in function when the brake pedal is applied. When the road conditions are severe, the snow brake system can be readily engaged for brake application, thus both regular and emergency brake systems are functional when the same brake pedal is applied.

The disclosed brake system comprises at least two brake boosters, each being mounted on one side and underneath of the vehicle. To ensure the stability of the vehicle, it is preferable to have the brake boosters mounted toward the front wheels of the vehicle. Each of the brake boosters comprises a housing or frame made of heavy-duty metal material, such as iron and steel and a hydraulic booster. The hydraulic booster is rotatably mounted in the housing and the housing is firmly and securely attached, or preferably bolted to the underneath of the vehicle so that the hydraulic booster may be rotated through a controlling mechanism. The hydraulic booster comprises a piston and a frictional head. The frictional head is demountably mounted to the piston at one end. When the piston is driven forward or downward if the hydraulic booster is positioned vertically, the frictional head is to confront the road surface and cause a considerable frictional force between the frictional head and the road surface. The demountability of the frictional head makes it possible to replace a new frictional head since it may be worn out after repeated uses. The frictional head, preferably being shaped with a tip at the end, may be replaced like a brake pad in a regular brake system. The controlling mechanism controls the positions of the brake boosters, being either in a released position and an engaged position.

Accordingly, an important object of the present invention is to provide a generic brake mechanism to enhance the performance of a regular brake system in severe road conditions;

Another object of the invention is to provide a supplemental snow brake system for a vehicle having a regular brake system, the snow brake system being effective, along with the regular brake system, to stop the vehicle in slippery road conditions.

Still another object of the invention is to have a supplemental emergency brake system that is readily released so that only the regular brake system is in function and alternatively that is readily engaged so that both the regular brake system and the emergency brake system are in function simultaneously.

Other objects, together with the forgoing are attained in the exercise of the invention in the following description and resulting in the embodiments illustrated in the accompanying drawings.

BRIEF DESCRIPTION OF THE DRAWINGS

FIG. 1.1 illustrates a schematic side view of one exemplary embodiment of the snow brake system equipped in a passenger vehicle (the brake in engaged position); FIG. 1.2 illustrates the schematic side view of the exemplary embodiment with the snow brake in a released position;

PREFERRED EMBODIMENT—DESCRIPTION

Figure 2:
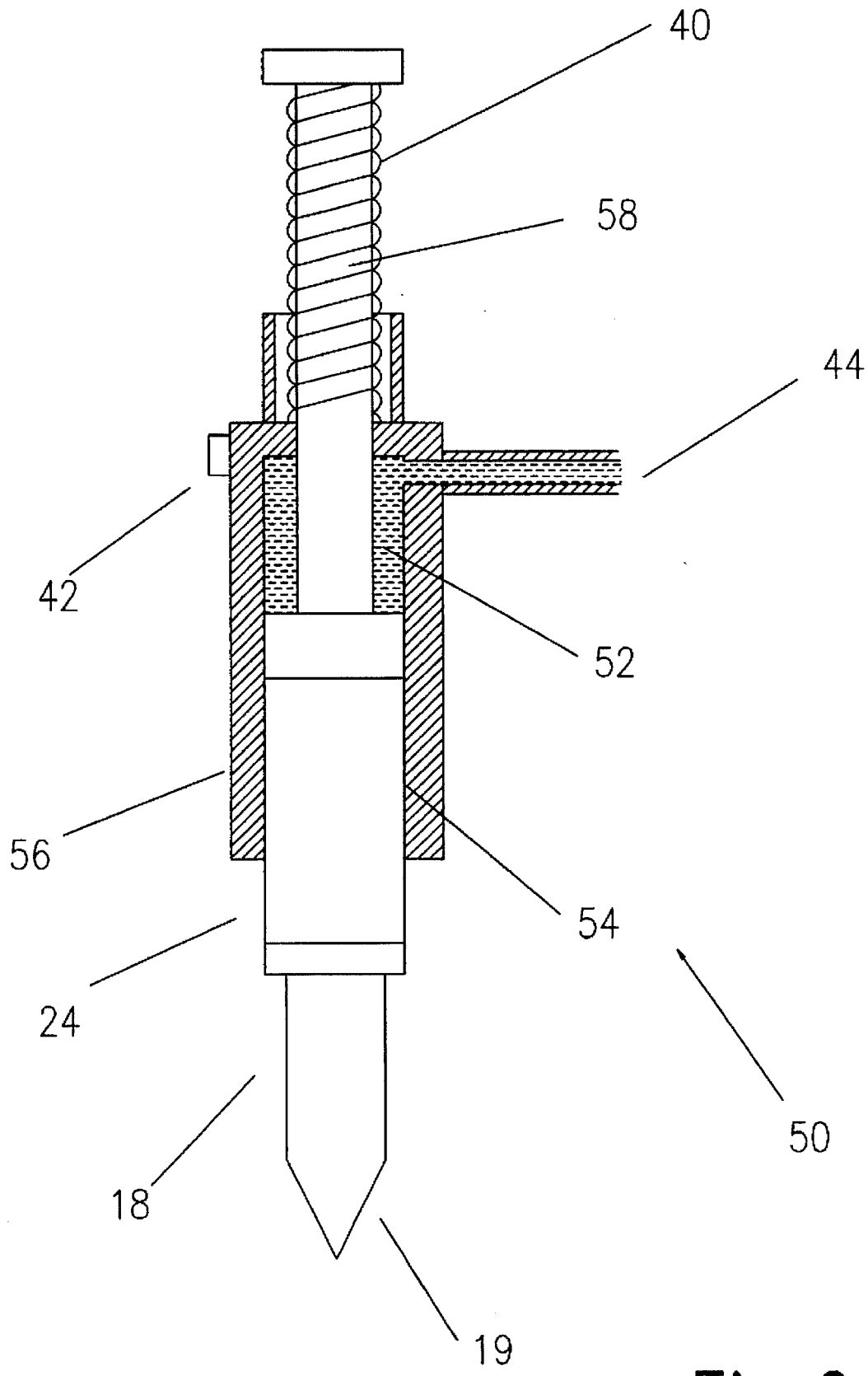
FIG. 2 shows a schematic structure of a hydraulic booster employed in the snow brake system of FIG. 1.

Referring now to the drawings, in which like numerals refer to like parts throughout the several views, FIG. 1.1 shows a schematic side view of one embodiment of the disclosed snow brake system equipped in a passenger car 12. The snow brake system comprises at least two brake boosters 10, yet it is shown in the figure that only one such brake booster is equipped for clear illustration. It is understood to those skilled in the art that at least a pair, one on each side of the vehicle, should be used for the stability of the vehicle when the brake system herein is applied. The brake boosters 10 may be positioned anywhere under the car 12, it is preferable to mount them between the front wheel 14 and the rear wheel 16 of the vehicle 12. Regarding the number of the brake boosters used in a vehicle, it is preferable to use even number, for example two pairs of or four such brake boosters are used for one vehicle, one pair being mounted around the front wheels and the second pair being mounted around the rear wheels. For economic reasons, a pair of such brake boosters may suffice for a passenger car, in which case the pair are mounted more towards to the front wheel 14 as illustrated in the figure. A brake handle 20 that controls the positions of the brake system is preferably positioned near the steering wheel 22 so that the operator of the vehicle may readily get the brake system into an engaged position when the operator sees the need. For example, the road surface is covered with a layer of ice and becomes slippery. To prevent from going an uncontrollable excessive extent, it is safe and practical to get the snow brake system engaged for brake application. The brake system is then released by the same handle when the operator sees there is no need to have the snow brake system engaged for brake application. The released position of the brake booster 10 is shown in FIG. 1.2. The brake handle 20 is illustrated as a mechanical device to have the brake system in either released or engaged position. It is yet understood to those skilled in the art that the control handle may be replaced by an electronic device mounted on the dash board of the vehicle, the device then controls a device, for example a motor, which further controls the positions of the brake boosters. The individual positions of the brake booster will be fully described hereinafter.

To fully understand the disclosed brake system, it is necessary to describe a hydraulic booster that is used in the brake system. Referring now to FIG. 2, there is shown a hydraulic booster 50 used in the brake system. The booster 50 having a booster housing 56 is preferably made of heavy-duty metal material such as iron or steel. A booster chamber 52 and a cavity 54 are formed and communicated in the booster housing 56. The booster chamber 52 may be filled with oil or other fluid and communicates with a piston 24 slidably positioned in a fluid tight manner in the cavity 54. A hydraulic line 44 communicates at one end directly with the booster chamber 54 and is filled with the same fluid as in the booster chamber 52, wherein a depressed force applied at the other end of the hydraulic line 44 is transmitted through the fluid therein to the booster chamber 52. The depressed force applied to the hydraulic line 44 may be obtained from the brake pedal (not shown). When the brake pedal is depressed down to stop the vehicle, the depressed force is generated and cause the compression of the fluid and hydraulic pressure in the hydraulic line 44, that further transmits the hydraulic pressure to the booster chamber. The piston 24 is then driven downward by the hydraulic pressure in the booster chamber 52. At one end of the piston 24, an extension shaft 40 is integral with the piston 24. The extension shaft 40 is actuated upward by a coil spring 58 to lift the piston 24. The coil spring 58 is compressed when the piston 24 is driven downward by the pressure in the fluid in the booster chamber 52. The piston 24 therefore moves upward by the spring released when there is no pressure in the booster chamber 52.

At the other end of the piston 24, a frictional head 18 is mounted thereon. The head 18 is made of heavy-duty material, such as those used for the brake pads in a regular brake system and preferably shaped, like a corn or pyramid, with narrow tip at the end 19 so that the head, when driven downward by the piston 24, may brake through ice on a road surface or create sufficient frictional force between the head and the road surface, thereby the vehicle so equipped along with the regular brakes on the wheels can be efficiently stopped. To control the position of the brake booster 50, a locking strut 42 is firmly attached thereon. A control mechanism, through the locking strut 42, can position the hydraulic booster 50 accordingly as described in the following two figures.

To further ensure the stability of the vehicle when such brake system is applied, a device which measures the pressure in every brake booster, respectively, is used. A road surface is often non-flat having up and down bumps. Such road conditions may cause the brake boosters unevenly driven. For example, one brake booster has confronted the road surface and the other one is still advancing to the road surface because of the bumps in the road surface. The confronted one may be overdriven therefor and cause the instability of the vehicle. If the pressures in the confronted one and the advancing one are detected by the pressure measuring device and the pressures thereof are generally unequal, there are ways to equalize the pressures, transmitting additional pressure in the advancing one or reducing pressure in the confronted one so that all brake boosters are equally driven. It is understood to those skilled in the art that such pressure measurement and equalization can be achieved through the hydraulic line 44 and the hydraulic line 44 may be actuated by a pressure from a master booster which receives the pedal operation. The master booster may be another hydraulic booster or other pressure amplifier. The use of the master booster reduces the brake pedal effort as well as makes it easy to equalize the pressures in each of the hydraulic boosters.

Figure 3:
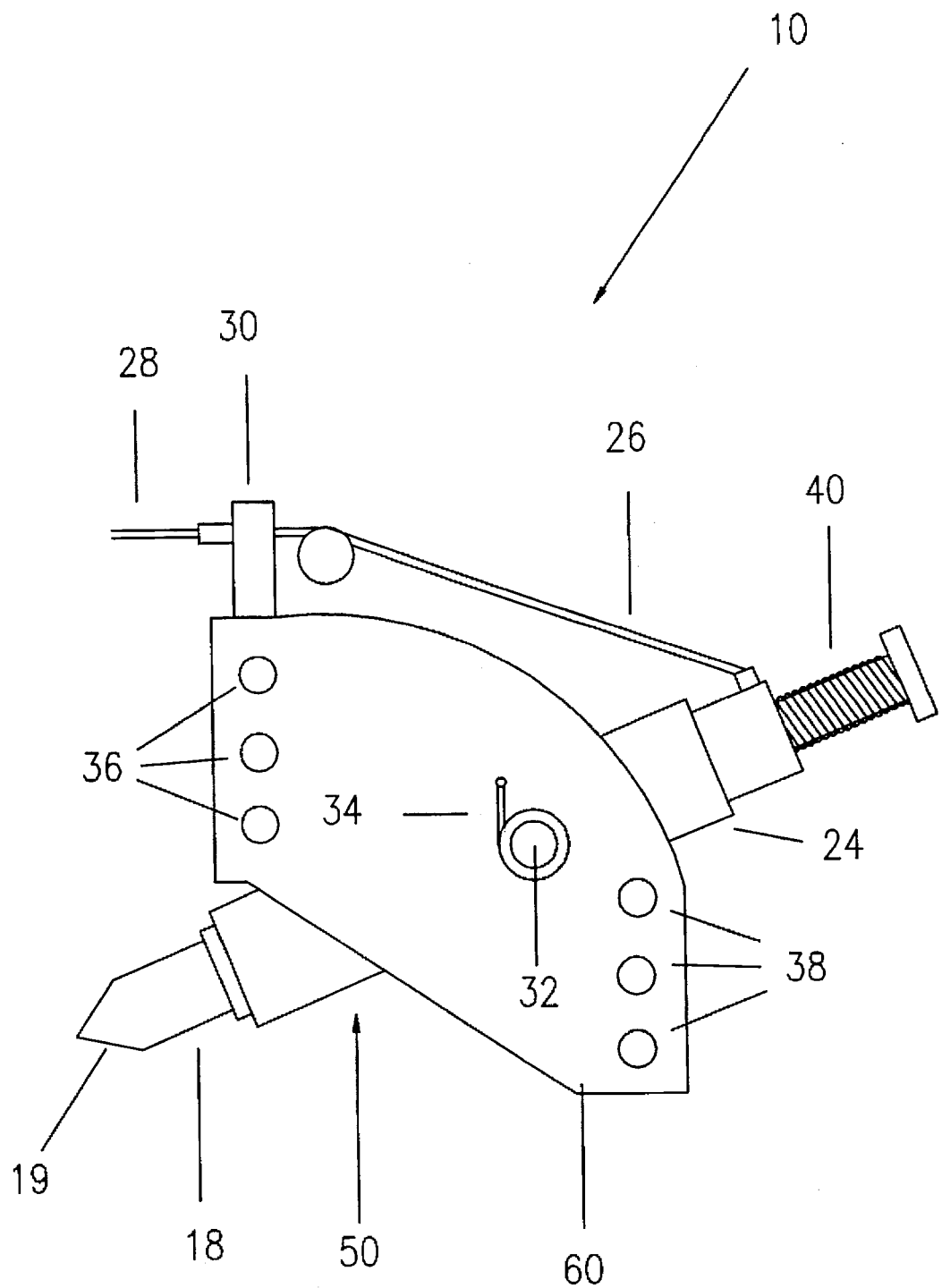
FIG. 3 shows one embodiment of a brake booster in a released position.

Now referring to FIG. 3, there is depicted the brake booster used in FIG. 1.1 being in a released position. Frame or housing 60 is made of solid material, preferably iron or steel and is mounted to the vehicle. Holes indicated by 36 and 38 may be used for bolting to the side and underneath of the vehicle. A steel cable or chain 26 and 28 having one end connected to the brake handle 20 in FIG. 1.1 and another end connected to the locking strut 42 of the hydraulic booster 50 also shown in FIG. 2. The hydraulic booster 50 is rotatably mounted to the housing 60 through a pin 32 so that the hydraulic booster 50 rotates clockwise when the cable 26 is released to place the hydraulic booster 50 to a released position as shown in the figure. The clockwise rotation of the brake system 52 is caused by a biased spring 34 mounted on the pin 32 The biased spring 34 is relaxed as to rotate the hydraulic booster 50 clockwise when the cable 28 is released. It is understood to those skilled in the art that the hydraulic line 44 can be disconnected as to have the released brake boosters in idle status. Thus only the regular brake system is in function when the brake pedal is applied.

Figure 4:
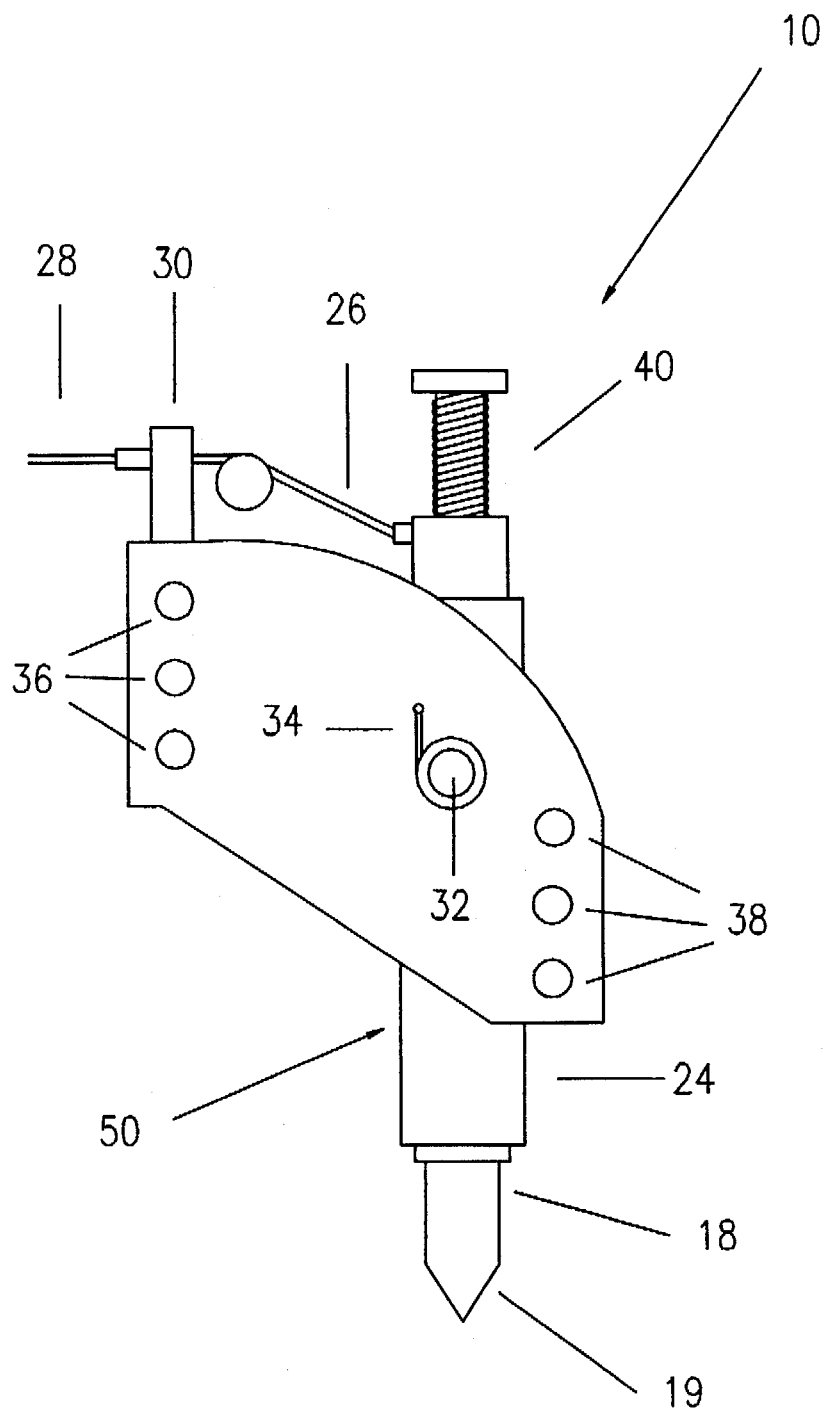
FIG. 4 shows one embodiment of the same brake booster in an engaged position.

Referring now to FIG. 4, there is shown the system being in an engaged position with the frictional head facing downward. The engaged position is placed by pulling or shortening the cable 26 and 28 through, for example, a motor. The biased spring 34 is therefore in tension as it has been spanned. When the brake pedal is applied, the frictional head is driven downward by the hydraulic pressure in the hydraulic booster actuated directly or indirectly by a depressed force applied to the brake pedal. The material for the frictional head is preferably the one used for brake pads in regular brake systems. Such material lasts longer and causes no or little damages to the road surface. A considerable frictional force is thus generated between the frictional head and the road surface when the frictional head confronts the road surface. The frictional force, along with the regular brake system of a vehicle that retards the motion of the wheels thereof, suffices to stop the vehicle immediately. With the pressures in each of the brake boosters being equalized, the stopped vehicle is in a stabilized position.

The present invention has been described in sufficient detail with one exemplary embodiment. Alternative embodiments will become apparent to those skilled in the art to which the present invention pertains without departing from its spirit and scope. Accordingly, the scope of the present invention is defined by the appended claims rather that the forgoing description of one embodiment.

What is claimed is:

1. A snow brake system for a vehicle having a brake pedal and a brake control handle, the snow brake system comprising:

at least two brake boosters, each being mounted on one side of the vehicle;

each of the booster further comprising at least one hydraulic booster, the booster having an internal piston driven downward by a pressure transmitted from and in proportion to a depressed force applied to the brake pedal;

a pair of frictional heads, each being detachably mounted to one end of the piston so that the head confronts to a road surface when the piston is driven downward; and means controllable by the brake control handle for engaging the brake boosters to a retracted position when there is no need to get the brake booster ready for brake application and an engaged position when there is a need to get the brake booster ready for brake application.

2. The snow brake system as recited in claim 1 wherein the frictional head is made of heavy-duty material and being so shaped with a tip at the end so that the frictional head is able to brake through ice to confront the road surface.

3. A snow brake system for a vehicle having at least a pair of front wheels and rear wheels, a brake pedal and a brake control means, the snow brake system comprising:

at least two brake boosters, each being mounted on one side and underneath of the vehicle as well as between the front wheels and the rear wheels;

each of the brake boosters comprising:

a housing made of heavy-duty steel material;

a hydraulic booster having a booster chamber filled with a fluid and a an internal piston driven downward by the pressure in the fluid transmitted from a pressure in proportion to a depressed force applied to the brake pedal;

a frictional head made of heavy-duty material, the frictional head being so shaped with a tip at one end and detachably mounted to one end of the piston, and generating a considerable frictional force between the head and a road surface when the frictional head is driven downward to confront the road surface; and means for rotatably mounting the hydraulic booster to the housing; and means controllable by the brake control handle for placing the brake boosters to a retracted position when there is no need to get the brake boosters ready for brake application and to an engaged position when there is a need to get the brake boosters ready for brake application.

\* \* \* \* \*